United States Patent
Bare et al.

(10) Patent No.: US 9,544,216 B2
(45) Date of Patent: Jan. 10, 2017

(54) MESH MIRRORING WITH PATH TAGS

(75) Inventors: Ballard Claude Bare, Auburn, CA (US); Shaun Kazuo Wakumoto, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1111 days.

(21) Appl. No.: 11/051,572

(22) Filed: Feb. 4, 2005

(65) Prior Publication Data

US 2006/0176880 A1  Aug. 10, 2006

(51) Int. Cl.
*H04L 12/26* (2006.01)
*H04L 12/56* (2006.01)
*H04L 12/701* (2013.01)
*H04L 12/707* (2013.01)

(52) U.S. Cl.
CPC ............... *H04L 45/00* (2013.01); *H04L 45/24* (2013.01)

(58) Field of Classification Search
CPC ........................................................ H04L 29/06
USPC .............. 370/389, 254, 390, 230, 245, 351, 397,370/399, 395.31, 395.52, 474, 475, 476, 312,370/432, 395.5, 471, 349, 392, 466; 726/23; 709/246
See application file for complete search history.

(56) References Cited

U.S. PATENT DOCUMENTS

| | | | |
|---|---|---|---|
| 6,041,042 A * | 3/2000 | Bussiere | 370/245 |
| 6,198,751 B1 * | 3/2001 | Dorsey et al. | 370/466 |
| 6,493,318 B1 | 12/2002 | Bare | |
| 6,570,875 B1 * | 5/2003 | Hegde | 370/389 |
| 6,577,600 B1 | 6/2003 | Bare | |
| 6,580,715 B1 | 6/2003 | Bare | |
| 7,031,304 B1 * | 4/2006 | Arberg et al. | 370/360 |
| 7,227,862 B2 * | 6/2007 | Kalkunte et al. | 370/389 |
| 2002/0028656 A1 * | 3/2002 | Yemini | H04L 29/12009 455/41.2 |
| 2002/0159456 A1 * | 10/2002 | Foster et al. | 370/390 |
| 2004/0213232 A1 * | 10/2004 | Regan | 370/390 |
| 2005/0083936 A1 * | 4/2005 | Ma | 370/392 |
| 2006/0002370 A1 * | 1/2006 | Rabie et al. | 370/389 |
| 2006/0067216 A1 * | 3/2006 | Lalonde et al. | 370/230 |

FOREIGN PATENT DOCUMENTS

WO   WO 2004025884 A2 *  3/2004

OTHER PUBLICATIONS

Finn, "Two Models for VLAN Tagging", Mar. 8, 2006, pp. 1-6.*

* cited by examiner

*Primary Examiner* — David Oveissi
(74) *Attorney, Agent, or Firm* — Fabian VanCott (57) ABSTRACT

A method of mirroring select traffic in a switching mesh. A packet is received at an edge switch of the switching mesh, and a determination is made as to whether the packet is to be mirrored based on mirroring criteria. A path tag associated with a path through the switching mesh is selected. The path tag is associated with a mirror path if the packet is to be mirrored. The path tag is added to the packet, and the tagged packet is forwarded to a next switch along the path. Other embodiments are also disclosed.

20 Claims, 6 Drawing Sheets

MESH MIRRORING WITH PATH TAGS

CROSS-REFERENCE TO RELATED APPLICATION

The present application is related to U.S. patent application Ser. No. 10/812,267, entitled "Load Balancing with Mesh Tagging," filed Mar. 29, 2004 by inventors Shaun K. Wakumoto et al. The disclosure of the aforementioned U.S. patent application Ser. No. 10/812,267 is hereby incorporated by reference.

BACKGROUND OF THE INVENTION

Field of the Invention

The present invention relates generally to communication networks. More specifically, the present invention relates to network switches and switch-to-switch protocols.

Description of the Background Art

It is common in conventional computing environments to connect a plurality of computing systems and devices through a communication medium often referred to as a network. Such networks among communicating devices permit devices (or users of devices) to easily exchange and share information among the various devices.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At one level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A network segment may be defined as any subset of the network computing environment including devices and their respective interconnecting communication links.

As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. Therefore, some network computing environments utilize a plurality of redundant paths to enhance reliability of the network. Multiple paths between two devices enhances reliability of network communication between the devices by allowing for a redundant (backup) network path to be used between two devices when a primary path fails.

SUMMARY

One embodiment of the invention pertains to a method of mirroring select traffic in a switching mesh. A packet is received at an edge switch of the switching mesh, and a determination is made as to whether the packet is to be mirrored based on mirroring criteria. A path tag associated with a path through the switching mesh is selected. The path tag is associated with a mirror path if the packet is to be mirrored. The path tag is added to the packet, and the tagged packet is forwarded to a next switch along the path.

Another embodiment of the invention pertains to a switching apparatus configured to be a member of a switching mesh. The apparatus includes a plurality of ports and a switch control device coupled to the plurality of ports. The switch control device is configured to receive a packet at a non-mesh port, determine whether the packet is to be mirrored based on mirroring criteria, select a path tag associated with a mirror path through the switching mesh if the packet is to be mirrored, add the path tag to the packet, and forward the tagged packet to a next switch along the path.

Another embodiment of the invention pertains to a system for replicating select traffic in a switching mesh. The system includes means for finding whether a packet is to be replicated based on selection criteria, means for choosing a path tag associated with a path through the switching mesh, means for pre-pending the path tag to the packet, and means for transmitting the tagged packet to a next switch along the path. The path tag comprises a mirror path tag if the packet is to be mirrored.

Other embodiments are also disclosed.

DETAILED DESCRIPTION

A. Switching Mesh and Path Tagging

Figure 1:
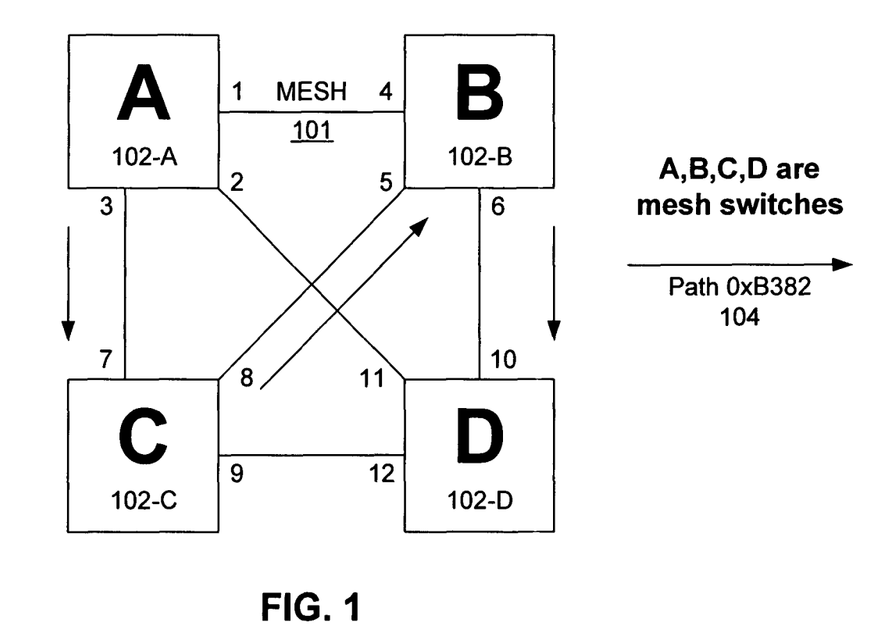
FIG. 1 is a schematic diagram depicting a switching mesh in accordance with an embodiment of the invention.

FIG. 1 is a schematic diagram depicting a switching mesh 101 in accordance with an embodiment of the invention. One example path 104 is shown in FIG. 1. This path 104, designated in this instance as path 0xB382, travels as follows: exits port 3 of switch A 102-A; enters port 7 of switch C 102-C; exits port 8 of switch C 102-C; enters port 5 of switch B 102-B; exits port 6 of switch B 102-B; and enters port 10 of switch D 102-D.

In accordance with an embodiment of the invention, mesh tagging is utilized to advantageously identify paths within the mesh 101 from a source switch to a destination switch. In one implementation, each source/destination pair may be configured with up to thirty-one different paths. This is because four bits are used for the path identifier in a path tag and the zero value is considered invalid in this specific implementation. One example of such a path tag is described further below in relation to FIG. 2. Other embodiments may provide a different number of broadcast paths per switch by using a different number of bits for the path identifier. For example, if the path identifier has six bits, then each source/destination pair may be configured with sixty-three different paths.

Figure 2:
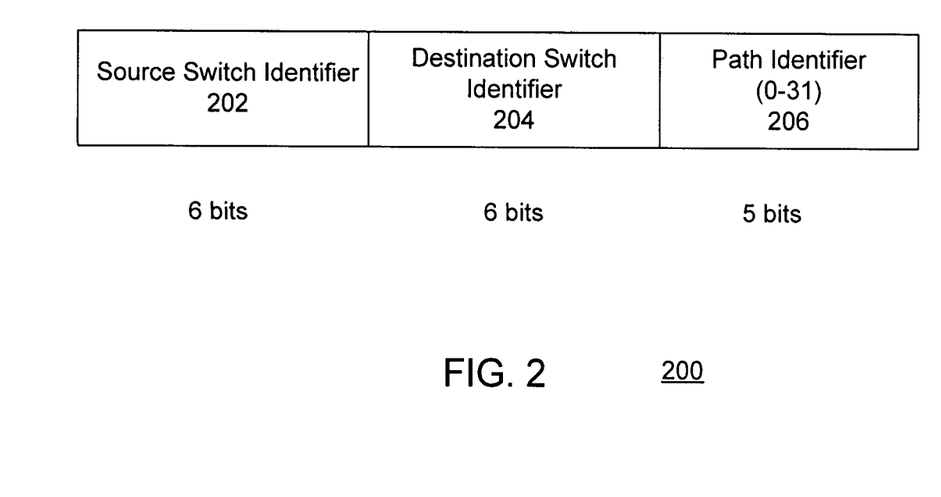
FIG. 2 is a diagram of a path tag in accordance with an embodiment of the invention.

FIG. 2 is a diagram of a path tag 200 in accordance with an embodiment of the invention. The path tag 200 includes a source switch identifier 202, a destination switch identifier 204, and a path identifier 206.

In the illustrated embodiment, the path tag is seventeen bits in length. In particular, the source switch identifier 202 is six bits long, the destination switch identifier 204 is six bits long, and the path identifier 206 is five bits long. With the switch identifiers being six bits long, sixty-three different switches in the mesh may be distinguished and identified. (The value zero for the switch id being considered an invalid value in this implementation.) With the path identifier 206 being five bits long, thirty-one different paths may be identified per source/destination pair. (The value zero for the path id again being considered invalid in this implementation.)

Other embodiments may have other lengths for these fields, resulting in different numbers of identifiable switches and paths. For example, another embodiment may utilize a three byte tag that provides one byte (eight bits) each for the source switch identifier, the destination switch identifier, and the path identifier.

Consider, for example, the mesh 101 depicted in FIG. 1. Path tags 200 of the format depicted in FIG. 2 may be used to identify different paths, for instance, from switch A to switch D. Given those source and destination switches, each path tag 200 would include an identifier corresponding to switch A in the source switch identifier field 202 and an identifier corresponding to switch D in the destination switch identifier field 204. The path identifier field 206 identifies a particular path (among the various paths) through the mesh topology from the source switch to the destination switch.

For instance, a first path may go directly from A to D by exiting port 2 of switch A and entering port 11 of switch D. A second path (not shown) may travel from A to D via switch C by exiting port 3 on switch A, entering port 7 of switch C, exiting port 9 of switch C, and entering port 12 of switch D. And so on for other possible paths.

As pertaining to the mesh mirroring disclosed herein, the number of possible path identifiers 206 per source/destination pair may be configured to be relatively large so as to accommodate various mirror paths, as well as (non-mirror paths. Mirror and non-mirror paths are discussed further below.

B. Mesh Mirroring Using Path Tags

As discussed above in relation to FIGS. 1 and 2, mesh path tagging involves assigning path tags to specific routes or paths through a switching mesh. Packets forwarded with a path tag will be forwarded along the associated route or path to the terminating edge switch in the mesh. At the terminating edge switch (the mesh switch terminating the path), the packet is untagged (has the path tag removed) and forwarded out the appropriate port (or ports in the case of a broadcast path).

In accordance with an embodiment of the invention, mesh path tagging is utilized to provide an advantageous mirroring technique. This mirroring technique may be called "mesh mirroring with path tags" or simply "mesh mirroring." Advantageously, mesh mirroring may be implemented without requiring conventional tunneling or additional traffic streams.

Various mirroring criteria may be used to determine which packets are to be mesh mirrored. The mirroring criteria may include whatever criteria which the switch can use to determine how it will forward packets from outside mesh. In one example, all packets entering the mesh that have a particular destination address may be mirrored out of a specific switch port (or ports). In another example, the mirroring criteria may be so specific as to specify only those packets having a particular source address, a particular destination address, and communicating to a particular TCP port. Other mirroring criteria may be used in other examples.

Figure 3:
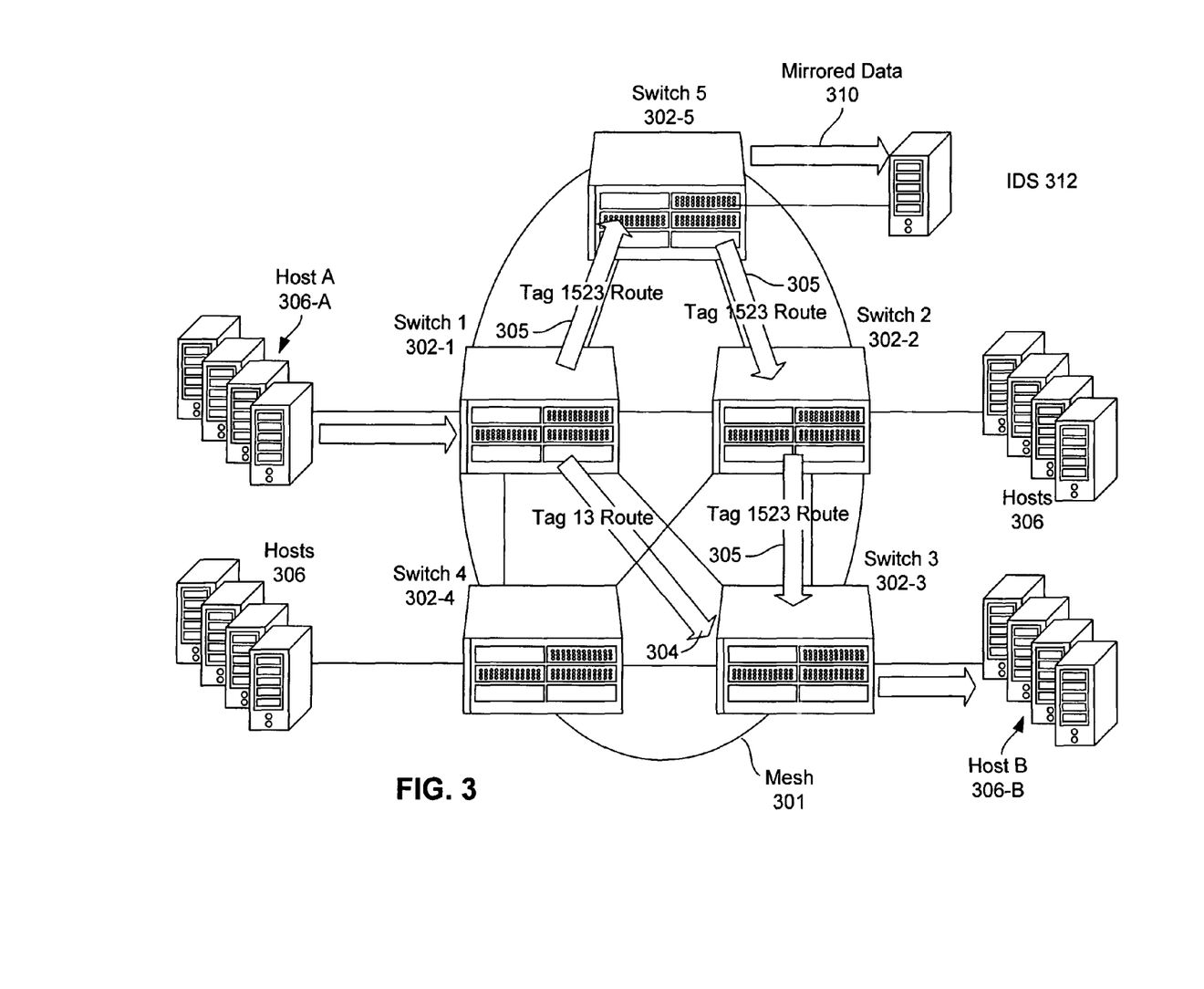
FIG. 3 is a diagram illustrating an example of a mesh mirroring system in operation in accordance with an embodiment of the invention.

FIG. 3 is a diagram illustrating an example of a mesh mirroring system in operation in accordance with an embodiment of the invention. The switching mesh 301 of FIG. 3 includes five mesh switches 302 (switch 1 302-1, switch 2 302-2, switch 3 302-3, switch 4 302-4, and switch 5 302-5) and various hosts 306 coupled to various ports of the mesh switches 302.

In the example illustrated in FIG. 3, packets from specific Host A 306-A to specific Host B 306-B may "normally" (i.e. without mirroring being enabled) take the normal path (Tag 13 Route) 304, which is a relatively short path from Host A to Host B. To accomplish this, switch 1 302-1 is configured to add the associated path tag (in this example, tag 13) to packets received from Host A 306-A that are destined for Host B 306-B (i.e. those packets with source address of Host A and destination address of Host B). The terminating switch, in this case switch 3 302-3, is configured to remove the path tag and forward the untagged packet out of the appropriate port leading to Host B 306-B.

Consider that a user decides to mirror the traffic from Host A to Host B to an intrusion detection system (IDS) 312, for example, due to some suspicious behavior observed. The IDS 312 is coupled to a port of a mesh switch (the "mirror switch"). In this example, the mirror switch is switch 5 302-5. In other examples, there may be more than one mirror switch in the switching mesh.

An appropriate "mirror path tag" (in this example, tag 1523) is created (or may previously have been created) to accomplish the desired mirroring. The mirror path tag may be created via user configuration or a network management tool.

The mesh switches 302 are programmed so as to route packets with the mirror path tag along a mirror path or route ("Tag 1523 Route") 305 that begins at the originating or source switch (in this example, switch 1 302-1), goes through each mirror switch (in this example, switch 5 302-5), and terminates at the destination switch (in this example, switch 3 302-3). The specific route associated with the mirror path tag may be chosen from various potential paths, each potential mirror path constrained so as to begin at the originating switch, go through each mirror switch, and end at the destination switch.

Each mirror switch (in this example, switch 5 302-5) is further programmed to create a copy of each packet with the mirror path tag, and to send the copied packet or portion thereof (i.e. the mirrored data 310) out of the port leading to the IDS 312. Before sending the mirrored packets to the IDS 312, the mirror switch may be programmed to remove the path tag.

Figure 4A:
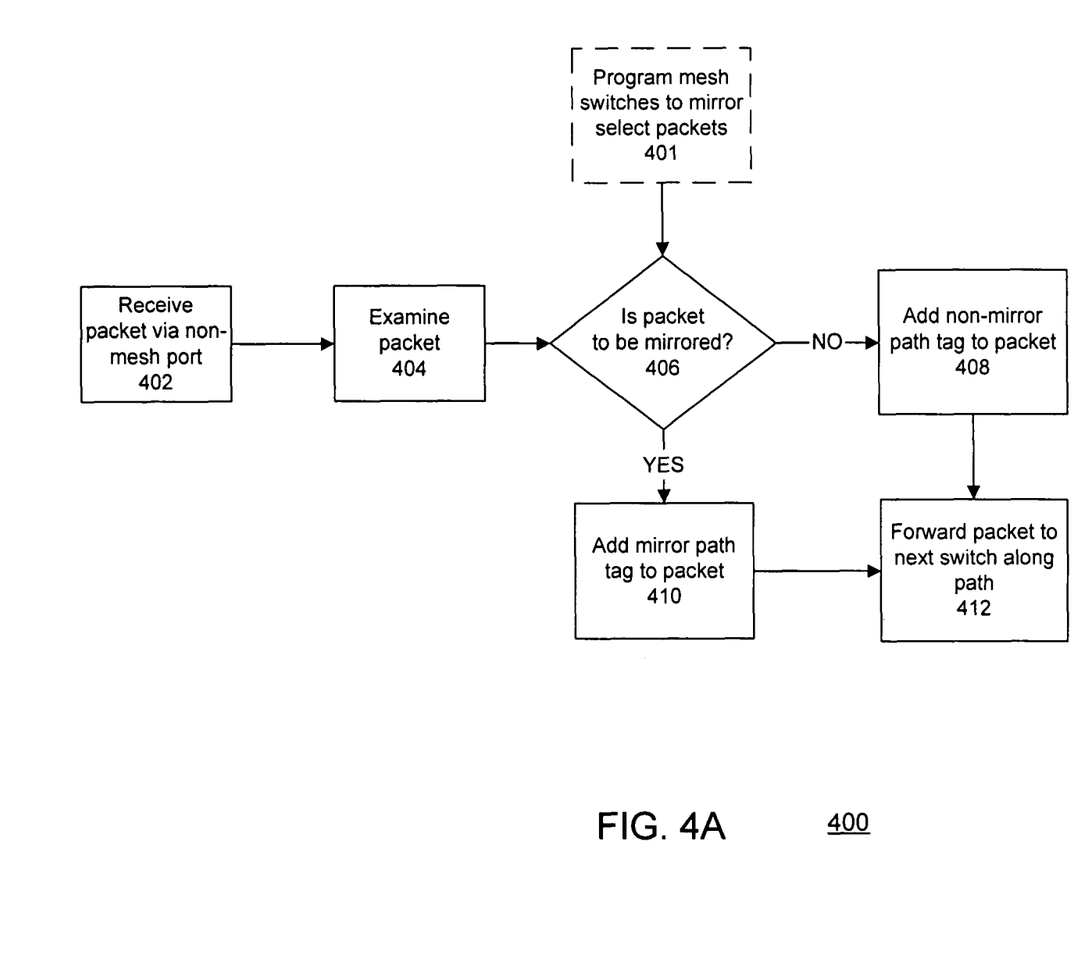
FIG. 4A is a flow chart depicting an example procedure at an originating mesh switch in accordance with an embodiment of the invention.

FIG. 4A is a flow chart depicting an example procedure 400 at an originating mesh switch in accordance with an embodiment of the invention. A packet is received (402) via a non-mesh port of the originating mesh switch. The originating mesh switch then examines (404) the packet and determines (406) whether or not the packet is to be mirrored.

As pertaining to the determination (406) of whether a packet is to be mirrored, a user may program (401) the mesh switches 302 to assign subsets of packets to particular "mirror path tags." As discussed above, a mirror path tag is a path tag that has been programmed for mirroring at one or more of the mesh switches. The subset of packets associated with each mirror path tag may be selected based on various criteria. The criteria may be based upon the packet data and/or information pertaining to a relationship between the packet and the switch. Mirroring criteria based upon the packet data may depend upon, for example, source/destination MAC/IP addresses, user datagram protocol (UDP) port number, transmission control protocol (TCP) port number, and so on. Mirroring criteria based upon the packet/switch relationship may depend upon, for example, inbound port, outbound port, VLAN, priority queue that the packet was put in, and so on). In one specific example, a subset of packets may include all packets for a given VLAN. In another specific example, a subset of packets may include those packets received on a specific inbound port of a particular switch.

If the packet does not meet the criteria for any subsets to be mirrored, then a non-mirror path tag is selected and added to the packet (408). In accordance with one embodiment, the non-mirror path tag may be selected depending upon latency measurements of the paths.

On the other hand, if the packet meets the criteria for a subset to be mirrored, then a mirror path tag is selected and added to the packet (410). Note that the non-mirror path tags and the mirror path tags may be of the same format per FIG. 2. The difference is that the mirror path tags are those path tags that have been programmed to be mirrored at one or more of the mesh switches along its path.

Finally, the packet with path tag is forwarded (412) by the originating switch to the next switch along the path. For example, in FIG. 3, if the originating switch is switch 1 302-1, and the path tag added is mirror "tag 1523," then the next switch would be switch 5 302-5. On the other hand, if the path tag added is non-mirror "tag 13," then the next switch would be switch 3 302-3.

Figure 4B:
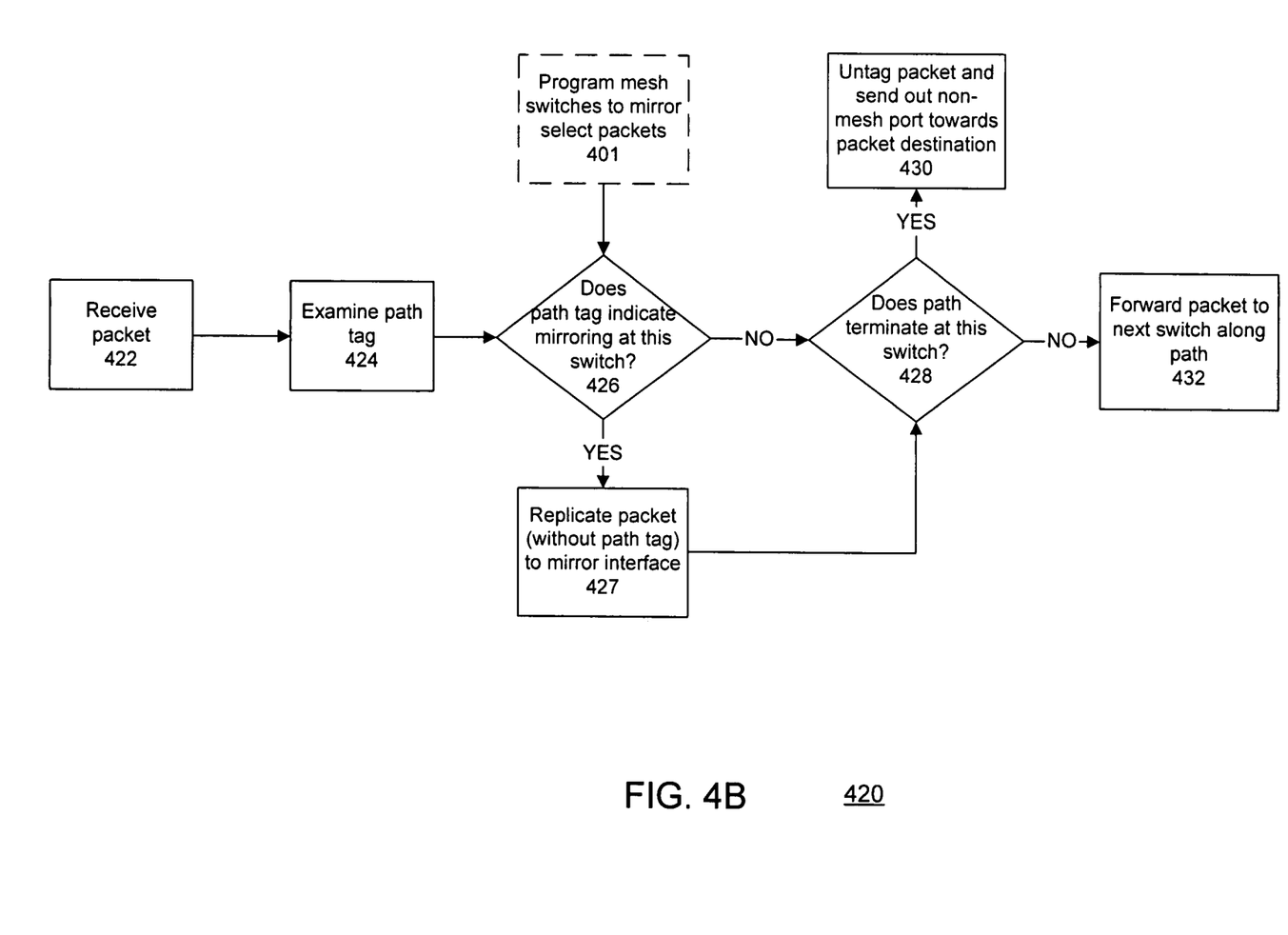
FIG. 4B is a flow chart depicting an example procedure at mesh switches along the mirror path in accordance with an embodiment of the invention.

FIG. 4B is a flow chart depicting an example procedure 420 at mesh switches along the mirror path in accordance with an embodiment of the invention. The tagged packet is received (422) at the switch. The switch then examines (424) the path tag and determines (426) from the path tag whether or not the packet is to be mirrored locally. For example, this determination (426) may be made by looking up the path tag in a tag entry table to see if a mirror bit has been set in the entry associated with the tag. The mirror bit may indicate to the switch that the packet is to be mirrored locally.

If the path tag indicates local mirroring, then the switch replicates (427) the packet to the appropriate mirror interface. Otherwise, the replication (427) is skipped. The replicated packet is without the path tag (i.e. has the path tag removed therefrom prior to transmission to the mirror interface).

The procedure 420 then goes on to determine (428) whether the path terminates at this switch. If the path terminates at this switch, then the packet is untagged and sent out (430) the non-mesh port leading towards the packet destination address. If the path does not terminate at this switch, then the packet is forwarded (432) to the next mesh switch along the path.

C. Example Packet Switch

Figure 5:
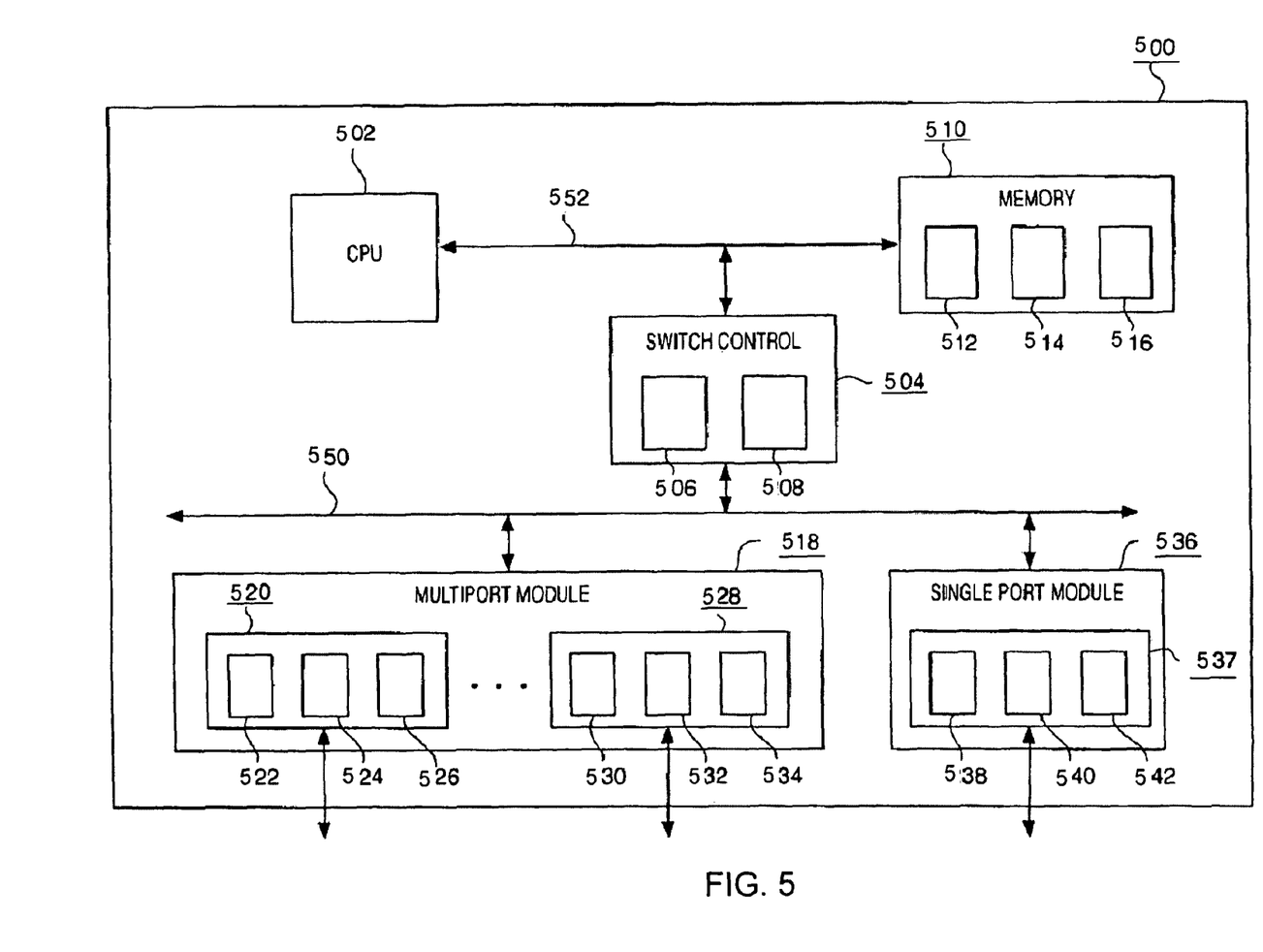
FIG. 5 is a schematic diagram of an example packet switch operable in accordance with an embodiment of the invention.

FIG. 5 is a schematic diagram of an example packet switch 500 operable in accordance with an embodiment of the invention. Various configurations of packet switches may be used, and the configuration shown in FIG. 5 is just one example.

A central processing unit (CPU) 502 may be configured to perform overall configuration and control of the switch 500 operation. The CPU 502 may be configured to operate in cooperation with a switch control 504. The switch control 504 may comprise an application specific integrated circuit (ASIC) designed to assist the CPU 502 in performing packet switching at high speeds required by modern networks.

The switch control 504 may be configured to control the "forwarding" of received packets to appropriate locations within the switch for further processing and/or for transmission out another switch port. Inbound and outbound high speed FIFOs (506 and 508, respectively) may be included with the switch control 504 for exchanging data over switch bus 550 with port modules.

The memory 510 may be configured to include a high and low priority inbound queue (512 and 514, respectively) and outbound queue 516. The high priority inbound queue 512 may be used to hold received switch control packets awaiting processing by CPU 502 while the low priority inbound queue 514 holds other packets awaiting processing by CPU 502. The outbound queue 516 may be configured to hold packets awaiting transmission to switch bus 550 via switch control 504 through its outbound FIFO 508. The CPU 502, switch control 504 and memory 510 may be configured to exchange information over processor bus 552 largely independent of activity on switch bus 550.

The ports of the switch may be implemented as plug-in modules that connect to switch bus 550. Each such module may be, for example, a multi-port module 518 having a plurality of ports in a single module or may be a single port module 536. Such a multi-port module 518 may provide an aggregate packet switch performance capable of handling a number of slower individual ports. For example, in one implementation, both the single port module 536 and the multi-port module 518 may be configured to provide, for example, approximately 1 Gbit per second packet switching performance. The single port module 536 therefore can process packet switching on a single port at speeds up to 1 Gbit per second. The multi-port module 518 would provide similar aggregate performance but distributes the bandwidth over, preferably, eight ports each operating at speeds, for example, of up to 100 Mbit per second. These aggregated or trunked ports may be seen as a single logical port to the switch.

Each port may include high speed FIFOs for exchanging data over its respective port. Specifically, each port, 520, 528, and 537, may include an inbound FIFO 522, 550, and 538, respectively for receiving packets from the network medium connected to the port. Further, each port 520, 528, and 537, may include a high priority outbound FIFO 524, 532, and 540, respectively, and a low priority outbound FIFO 526, 534, and 542, respectively. The low priority outbound FIFOs may be used to queue data associated with transmission of normal packets while the high priority outbound FIFO may be used to queue data associated with transmission of control packets. Each module (518 and 536) may be configured to include circuits (not specifically shown) to connect its port FIFOs to the switch bus 550.

As packets are received from a port, the packet data may be applied to the switch bus 550 in such a manner as to permit monitoring of the packet data by switch control 504. Switch control 504 may be configured to manage access to switch bus 550 by all port modules (i.e., 518 and 536). All port modules may be configured to "listen" to packets as the packets are received and applied by a receiving port module to switch bus 550. If the packet is to be forwarded to another port, switch control 504 may apply a trailer message to switch bus 550 following the end of the packet to identify which port should accept the received packet for forwarding to its associated network link.

In accordance with an embodiment of the invention, the switch control ASIC 504 is configured to insert, remove, and analyze a path tag 200 at a fixed location within a packet.

Furthermore, in accordance with an embodiment of the invention, a portion of the memory 510 in the switch 500 is configured to store a table of tag entries (the tag entry table). As discussed above, each tag entry in the table includes forwarding information pertaining to a particular path tag. The forwarding information may include the port (or set of ports) out of which the packet is to be forwarded. Preferably, the forwarding information also includes a mirror bit. The mirror bit may indicate to the switch control 504 to locally mirror the stream associated with a particular path tag out of a specific port (or set of ports). Such mirroring would apply to ingress packets only.

D. Advantages and Conclusion

The above disclosed systems and methods for mesh mirroring with path tags provide various advantages over the conventional systems and methods for mirroring.

First, while current mirroring techniques typically use a tunneling mechanism, no special tunneling is required to mirror packets when using the mesh mirroring technique disclosed herein. Using a tunneling mechanism, either the hardware or software encapsulates the packets (or portion thereof) in a tunnel header and then sends the mirrored stream to the desired end point (i.e. to the mirror interface). The end point then removes the encapsulation and copies the packet out the appropriate port (for example, using GRE encapsulation, see RFC 1701). In contrast, mesh mirroring with path tags works without tunneling. As such, packet encapsulation and decapsulation is avoided.

In addition, by using mesh mirroring with path tags, the entire packet to be mirrored is automatically available to the mirror switch (as well as to the other mesh switches along the mirror path). In contrast, because of the added header length due to encapsulation, the conventional tunneling technique often truncates full-sized packets or fragments full-sized packets into two packets each. Truncation loses information, and fragmentation takes up valuable processor bandwidth.

Furthermore, by using mesh mirroring with path tags, the mesh topology need contain only one stream for a given traffic flow, even if the stream is to be mirrored from various locations in the mesh. In contrast, the conventional tunneling technique would utilize an additional stream for each mirroring location.

The mesh mirroring technique disclosed herein also enables multicast streaming without actually using any multicast traffic. Any number of mesh switches along the mirror path may be programmed to mirror the stream of packets marked with a particular mirror path tag. Other streams of packets marked with other path tags may go through the exact same route as a mirror path but can be left un-mirrored or mirrored at different switches. This capability allows for many separate mirrors to be set up at different locations based on various forwarding criteria. In the case of intrusion detection, multiple IDS may be spread around the network topology, and the traffic passed to them may be load balanced based on the mirror path tag used.

Mesh mirroring with path tags comprises a form of replication. For example, this technique may be useful as a mechanism to mirror data for Ethernet storage replication, audio stream replication, video stream replication, or other applications without creating duplicate streams or using a multicast protocol. Different tags may be used to mirror or replicate different streams of traffic at any point or points in the mesh topology.

In conclusion, mesh mirroring with path tags allows for more efficient remote mirroring. Moreover, a new paradigm for mirroring/replication is enabled in which multiple end points efficiently receive the same packet stream.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of mirroring select traffic in a switching mesh, the method comprising:
   identifying multiple paths within the switching mesh from a source switch to a destination switch;
   assigning path tags to specific paths through the switching mesh;
   receiving a packet at the source switch at an edge of the switching mesh;
   determining whether the packet is to be locally mirrored based on mirroring criteria;
   selecting a path tag associated with a path through the switching mesh, wherein the path tag is associated with a mirror path when the packet is to be locally mirrored and comprises at least three fields including an identifier for the source switch, an identifier for the destination switch, and a path identifier, the path identifier identifying a specific path among a plurality of paths between said source and destination switches, the specific path directing the packet through each switch from which the packet is to be locally mirrored along the path between the source and destination switches;
   the source switch adding the path tag to the packet; and
   forwarding the tagged packet to a next switch along the path.

2. The method of claim 1, wherein the mirror path is programmed to pass through multiple switches from which the packet is to be locally mirrored.

3. The method of claim 1, further comprising:
   receiving the packet at the next switch along the path;
   examining the path tag;
   determining whether the path tag indicates local mirroring; and
   when local mirroring is indicated, then replicating the packet to a mirror interface.

4. The method of claim 3, wherein the determination of whether the path tag indicates local mirroring includes looking up the path tag in a tag entry table.

5. The method of claim 4, wherein entries in the tag entry table include a mirroring bit.

6. The method of claim 1, wherein the mirroring criteria depend upon data from the packet.

7. The method of claim 6, wherein the mirroring criteria comprise at least one criterion from a group consisting of source MAC address, destination MAC address, source IP address, destination IP address, TCP port number, and UDP port number.

8. The method of claim 1, wherein the mirroring criteria depend upon a relationship between the packet and the source switch.

9. The method of claim 8, wherein the mirroring criteria comprise at least one criterion from a group consisting of inbound port, outbound port, VLAN, ethertype, and priority queue.

10. The method of claim 1, wherein the mirroring criteria depend upon both data from the packet and information pertaining to a relationship between the packet and the source switch.

11. The method of claim 1, wherein said path through the switching mesh comprises a series of exit and entrance ports.

12. The method of claim 1, wherein the path tag does not include a tunnel and encapsulation of the packet.

13. The method of claim 1, wherein a path tag is assigned based on a load balancing operation within the switching mesh.

14. A switching apparatus configured to be a member of a switching mesh, the apparatus comprising:
- a plurality of ports; and
- a switch control device coupled to the plurality of ports, wherein the switch control device is along a path between a source switch and a destination switch and is configured to:
  - identify multiple paths within the switching mesh from the source switch to the destination switch;
  - assign path tags to specific paths through the switching mesh, wherein particular subsets of packets are assigned to particular path tags;
  - receive a packet at a non-mesh port,
  - determine whether the packet is to be locally mirrored based on mirroring criteria,
  - select a path tag associated with a mirror path through the switching mesh when the packet is to be locally mirrored,
  - add the path tag to the packet,
  - copy the tagged packet along the path,
  - send a copied tagged packet to an output port of the switch control device, and
  - forward the tagged packet to a next switch along the path,
- wherein the path tag comprises at least three fields including an identifier for the source switch, an identifier for the destination switch, and a path identifier, the path identifier indicating a specific path among a plurality of paths between said source and destination switches, the specific path directing the packet through each switch from which the packet is to be locally mirrored along the path between the source and destination switches.

15. The apparatus of claim 14, wherein the mirror path is configured to pass through multiple switches from which the packet is to be locally mirrored.

16. The apparatus of claim 14, wherein the switch control device is further configured to receive a forwarded packet via a mesh port, examine a path tag of the forwarded packet, determine whether the path tag of the forwarded packet indicates local mirroring, and replicate the packet to a mirror interface if local mirroring is indicated.

17. The apparatus of claim 16, wherein entries in the tag entry table include a mirroring bit.

18. The apparatus of claim 14, wherein said path through the switching mesh comprises a series of exit and entrance ports.

19. A system for replicating select traffic in a switching mesh, the system comprising:
- means for identifying multiple paths within the switching mesh from a source switch to a destination switch;
- means for assigning path tags to specific paths through the switching mesh;
- means for finding whether the packet is to be replicated based on selection criteria;
- means for choosing a path tag associated with a path through the switching mesh, wherein:
  - the path tag comprises a mirror path tag when the packet is to be locally mirrored,
  - the mirror path is a path along which the packet is to be mirrored,
  - the mirror path tag comprises at least three fields including an identifier for the source switch, an identifier for the destination switch, and a path identifier, the path identifier indicating a specific path among a plurality of paths between said source and destination switches, the specific path directing the packet through each switch from which the packet is to be locally mirrored along the path between the source and destination switches;
- means for pre-pending the path tag to the packet; and
- means for transmitting the tagged packet to a next switch along the path.

20. The system of claim 19, wherein the mirror path tag is associated in a table with a route passing through multiple switches at which the packet is to be locally replicated.

* * * * *